May 30, 1944.  D. O. SPROULE  2,350,080
COMPRESSIONAL WAVE INDICATOR
Filed Nov. 26, 1938  2 Sheets-Sheet 2
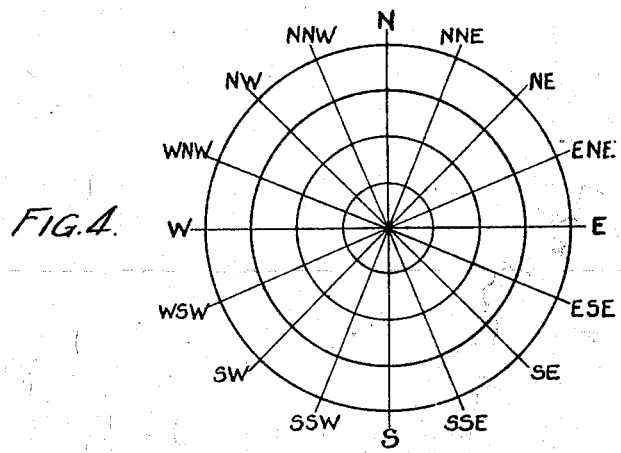
FIG. 4.
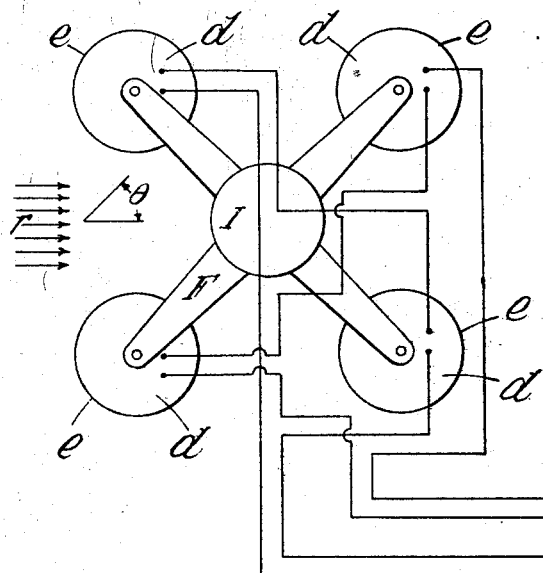
FIG. 5.
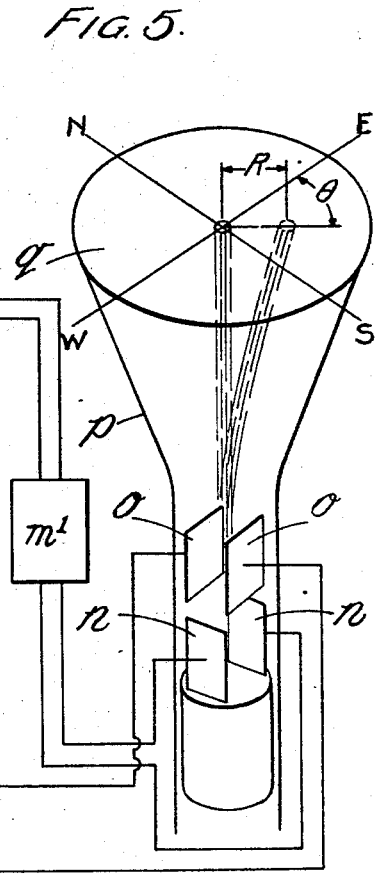
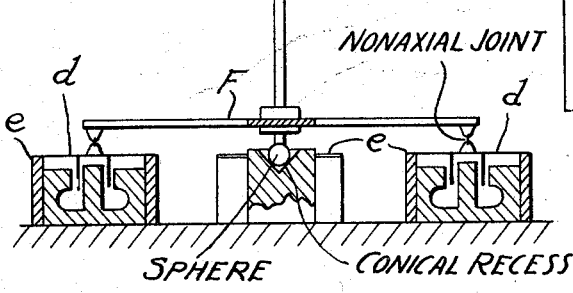
FIG. 6
NONAXIAL JOINT
SPHERE    CONICAL RECESS
Donald Orr Sproule
INVENTOR
By his ATT'Y Patented May 30, 1944

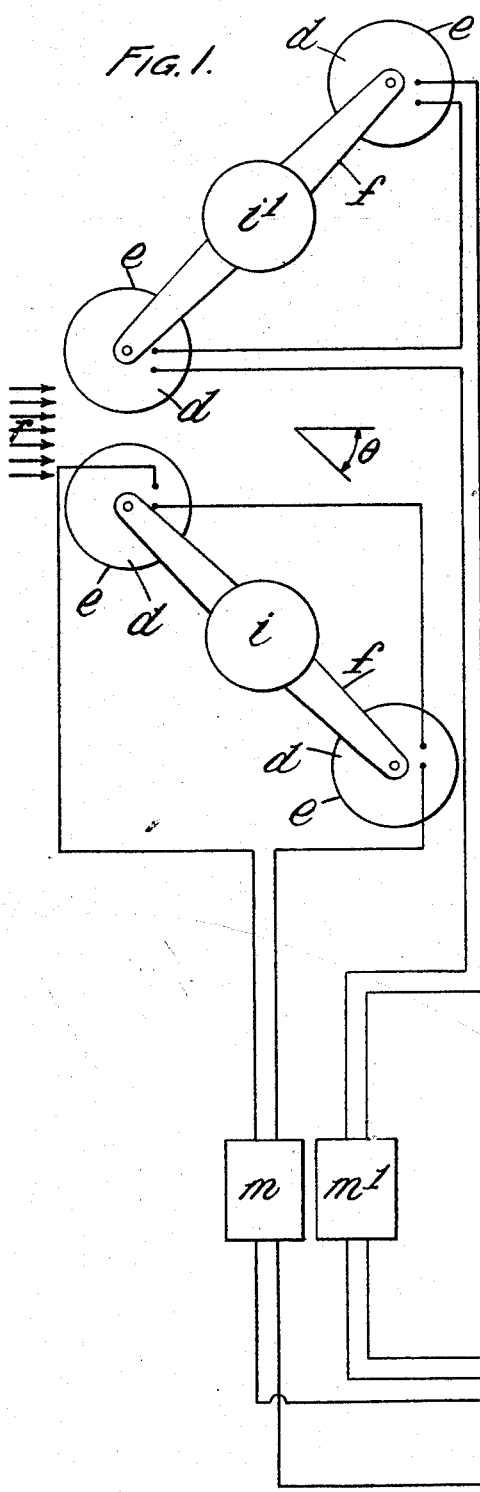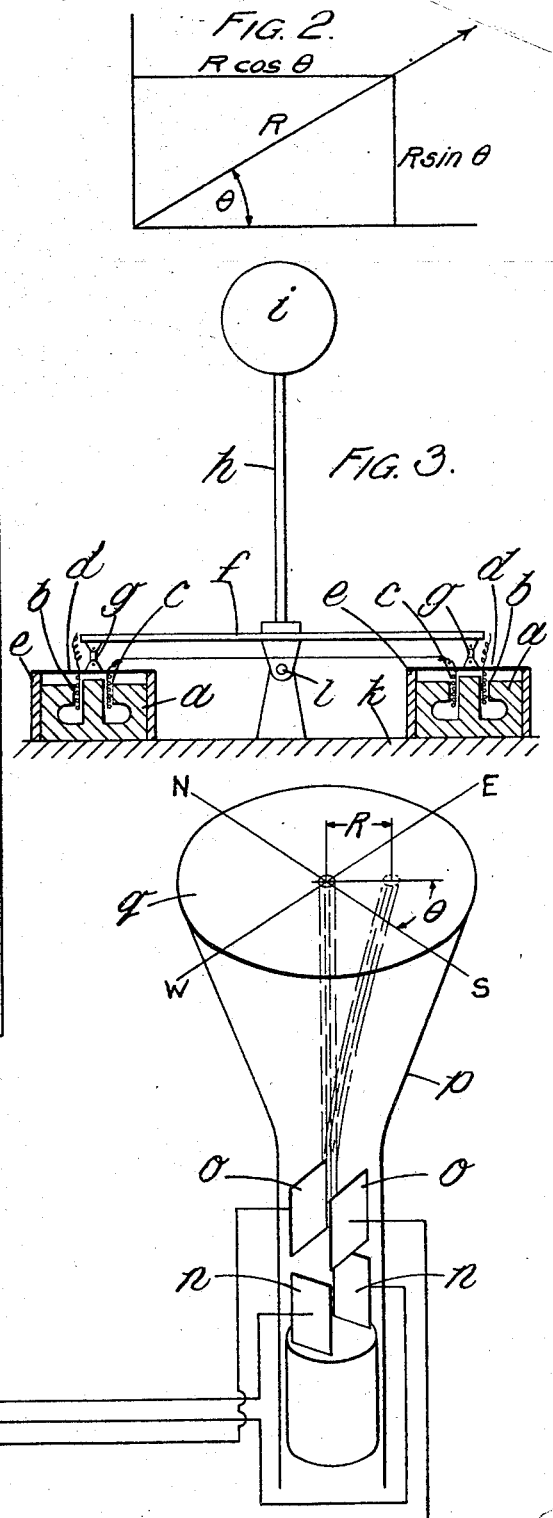

2,350,080

UNITED STATES PATENT OFFICE 2,350,080

COMPRESSIONAL WAVE INDICATOR

Donald Orr Sproule, London, England, assignor of one-third to Arthur Joseph Hughes, Essex, and one-third to Henry Hughes & Son Limited, London, England, a British limited-liability company Application November 26, 1938, Serial No. 242,642
In Great Britain November 26, 1937

6 Claims. (Cl. 177—352)

This invention relates to improvements in compressional wave indicators and has for its principal object to provide means whereby a direct reading can be obtained of the direction and magnitude of the wave motion energising the apparatus.

Further objects of the invention are to provide means whereby more rapid readings can be taken, increased convenience of operation and greater freedom from interference due to spurious waves can be obtained, and better results with waves which are exceedingly variable in intensity and/or infrequent in occurrence can be achieved than has been possible in the past.

Another object of the invention is to provide a robust and compact construction suitable for use on board ship and adapted to be employed with echo sounding apparatus.

This invention consists in improved compressional wave indicators comprising two groups of electrical current generators, compressional wave responsive means adapted to respond to the two components of a vector quantity of wave motion, mechanism connecting said means with said generators to cause said generators to convert said components into electrical pulses and a compound oscillograph adapted when excited by said electrical pulses to display the vectorial summation of the two components as a visible indication of the direction and magnitude of the wave motion.

In the following description it will be assumed that the wave motion under consideration is that of sound waves of the kind used in echo sounding apparatus, that the components are at right angles to one another and that the compound oscillograph is a cathode ray tube with crossed plates to facilitate description of the nature of the invention, but any or all of these qualifications and limitations may be modified as desired and as may be necessary to develop the invention fully and it will be understood that any of the vectors of wave motion, e. g., particle displacement, velocity or acceleration may be analyzed.

If a vector quantity in a wave front is resolved into two components along rectangular coordinates, said components respectively are proportional to the cosine and sine of the vector angle and this constitutes the type of response needed for the compressional wave responsive means.

In order that the nature of this invention may be the better understood, arrangements by way of example will now be described relatively to the accompanying drawings, the letters of reference in the several figures of said drawings relating to similar or equivalent parts in the different arrangements, in which:

Figure 1 is a diagram showing one arrangement by which the invention can be carried into effect;

Figure 2 is a vector diagram showing the method of analysis employed;

Figure 3 is a side elevation showing a schematic construction suitable for use in the arrangement shown in Figure 1;

Figure 4 shows the lines of reference applied to or associated with the fluorescent screen of a cathode ray tube suitable for use with this invention;

Figure 5 is a diagram showing an arrangement in which the two receiving apparatus of Figure 1 are combined into a single instrument, and, Figure 6 is a view in side elevation and partly broken away of the vibration detector disclosed in Figure 5.

As shown in Figures 1 and 3 there are two compressional wave responsive devices each of which comprises two moving coil assemblies having a pot magnet $a$ with a very small annular gap $b$ between the central pole and the outer pole, and a light weight coil $c$ located in said gap.

Each coil $c$ is mounted on the centre of a diaphragm $d$ which is supported peripherally at $e$, said diaphragm enabling the coil $c$ to be positioned accurately in the gap and operated rectilinearly through small displacements.

Constructed in this way each of the moving coil assemblies constitutes an electro motive generator and each compressional wave responsive device comprises two such generators simultaneously actuated by means of a cross-bar $f$ through connecting rods $g$, thus enabling movement of each coil $c$ to be effected in a straight line through its gap $b$ without angular bias due to rocking of the cross-bar $f$.

Each cross-bar $f$ is provided with a stem $h$ and is pivoted on the base $k$ of the assembly by a centrally arranged bearing $l$ the stem $h$ of one device having a light sphere $i$ upon its outer end whilst the stem $h$ of the other device has a light sphere $i'$ upon its outer end.

From Figure 1 it will be seen the two compressional wave responsive devices are arranged with the vertical planes containing the axes of the pot magnets $a$ at right angles.

The pair of moving coils $c,c$ of the compressional wave responsive device having the sphere $i$ are connected in series with one another and with the input of the thermionic amplifier $m$, and the moving coils $c, c$ of the other device having the sphere $i'$ are connected in series with one another and in series with the input of the thermionic amplifier $m'$ having similar amplitude and phase characteristics to the amplifier $m$.

The outputs from the amplifiers $m$ and $m'$ are applied to a compound oscillograph adapted when excited by the electrical pulses to display vectorial summation as a visible indication of the magnitude and bearing of the wave motion influencing the apparatus. To this effect the output from the amplifier $m$ is connected to the pair of electrostatic deflector plates $o$ of the cathode ray tube $p$ whilst the output from the amplifier $m'$ is connected to the other pair of electrostatic deflector plates $n$ arranged at right angles to the pair of plates $o$.

The tube $p$ has a fluorescent screen $q$ at its outer end with radial markings as shown in Figure 4 so that when the relation between the plane containing the vertical axes of the coils $c, c$ associated with the plates $n$ and the plane parallel with the deflector plates $n$ is known, the bearing of the received compressional wave $r$ can be ascertained; further the fluorescent screen $q$ has circular markings to enable the magnitude $R$ of said wave to be deduced.

In operation the devices are located with the spheres $i, i'$ separated by a distance which is small when compared with the wave length of the incoming compressional wave $r$ and as such devices are only electrically responsive to forces parallel with the plane containing the axes of the moving coils, on consideration of Figure 2 it will be clear that the electrical current generated by the coils $c, c$ traversing the gaps $b, b$ of the magnets $a, a$ in opposite directions due to the angular movement of the stem carrying the sphere $i$ and the electrical current generated by the coils $c, c$ traversing the gaps $b, b$ of the magnets $a, a$ in opposite directions due to angular movement of the stem of the sphere $i'$ can be represented vectorially by $R \sin \theta$ and $R \cos \theta$ respectively where $R$ represents the magnitude of the wave $r$ and $\theta$ is the angle of the bearing so that when such currents after similar thermionic amplification are applied to the pairs of deflector plates $n$ and $o$ the electron stream will be radially displaced from its central position a radial distance which will be a function of the magnitude of the wave $r$ and which can be ascertained by the circular markings on the fluorescent screen $q$ and the plane of the stream will be angularly displaced through an angle $\theta$ which can be ascertained by the radial bearings on the fluorescent screen $q$ (as shown in dotted lines in Figure 1).

In the arrangement shown in Figure 5 the electro magnetic devices shown in Figures 1 and 3 are combined and operated by a single sphere I mounted on the stem carried by an element F of cruciform shape mounted for free movement in any direction about a fixed centre, for example, a universal pivot as shown in Figure 6, said element F having a connecting rod at each extremity cooperating with a coil $c$ located in the gap $b$ of a pot magnet $a$, that is to say the sphere is elastically supported upon four generators of electrical current and is capable of deflection in any direction.

As in the previous arrangement already described, diagonally opposite coils $c, c$ are connected in series, one pair of coils being connected to the input of the thermionic amplifier $m$ whilst the other pair of coils is connected to the input of the thermionic amplifier $m'$ and the outputs of the amplifiers $m$ and $m'$ are connected to the pairs of deflector plates $o$ and $n$ respectively of the cathode ray tube so that the radial displacement of the indication of the electron stream on the fluorescent screen $q$ and the angular displacement of the plane of such stream will enable the magnitude and direction of the incoming compressional wave influencing the sphere I to be determined relatively to the circular and radial markings on said screen.

Although moving coil generators with permanent magnets have been described above and shown in the drawings, it will be obvious that generators of any equivalent kind such for example as magneto-strictive generators consisting of a pack of nickel stampings with a toroidal winding may be used, the permanent pot magnets may be replaced by electromagnets and the electrostatic deflector plates may be replaced with electromagnetic deflector coils.

I claim:

1. In a compressional wave detector and indicator including a compound oscillograph having two pairs of deflecting electrodes, the combination of a first pair of current generators electrically connected to one pair of electrodes, a second pair of current generators electrically connected to the other pair of electrodes disposed on a line at a right angle to a line extending through said first pair of current generators, said generators each including a movable coil, a pivotally movable cross-bar connecting the coils of each pair of generators, and at least one member responsive to the two components of a vector quantity of wave motion mounted on and supported by said cross-bars for causing movement of said coils to generate current to effect vectorial summation of the two components as a visible indication of the direction of the wave source.

2. In a compressional wave detector and indicator including a compound oscillograph having two pairs of deflecting electrodes, the combination of a first pair of current generators electrically connected to one pair of deflecting electrodes, a second pair of current generators electrically connected to the other pair of deflecting electrodes disposed on a line at right angles to a line extending through said first pair of current generators, said generators each including a movable coil, a cross-shaped member having each of its ends connected to one of said coils, means supporting said member for universal movement about a point between said generators, a substantially spherical member movable in response to compressional wave motion, and means mounted substantially centrally of said cross-shaped member for supporting said spherical member in spaced relation to said cross-shaped member for rocking the latter in response to compressional wave motion.

3. In a compressional wave detector and indicator including a compound oscillograph having two pairs of deflecting electrodes, the combination of a first pair of current generators electrically connected to one pair of deflecting electrodes, a second pair of current generators electrically connected to the other pair of deflecting electrodes disposed on a line at right angles to a line extending through said first pair of current generators, said generators each including a movable coil, a substantially rigid member connected to all of said coils, means supporting said member for universal rocking movement, and a member movable in response to compressional wave motion supported by said rigid member in spaced relation to and substantially midway between said generators for rocking said rigid member in response to said wave motion.

4. In a compressional wave detector and indicator including a compound oscillograph having two pairs of deflecting electrodes, the combination of a first pair of current generators electrically connected to one pair of deflecting electrodes, a second pair of current generators electrically connected to the other pair of deflecting electrodes disposed on a line at right angles to a line extending through said first pair of current generators, said generators each including a movable coil, a substantially rigid cross-bar connecting the coils of each pair of generators, and means movable in response to compressional wave motion supported substantially centrally of and in fixed relation to said cross-bars for rocking said cross-bars in response to wave motion.

5. In a compressional wave indicator comprising a compound oscillograph having two pairs of deflecting electrodes, the combination of two groups of electrical current generators, each generator including movable means for generating a current, compressional wave responsive means adapted to respond to the two components of a vector quantity of wave motion, pivotally movable mechanism connecting said compressional wave responsive means with said movable means of said generators to cause said generators to convert said components into electrical pulses, and means connecting each of said generator groups in series with one pair of said electrodes, respectively, to effect vectorial summation of the two components as a visible indication of the direction and magnitude of the wave motion.

6. In a compressional wave indicator comprising a compound oscillograph having two pairs of deflecting electrodes, the combination of two groups of electrical current generators, each generator including movable means for generating a current, two compressional wave responsive devices each of which is limited to respond only to one of the two components of a vector quantity of wave motion, pivotally movable mechanism connecting one of said devices to said movable means of one of said generator groups to convert one set of vectorial components into electrical pulses, pivotally movable mechanism connecting the other of said devices to said movable means of the other of said generator groups to convert another set of vectorial components into electrical pulses and means connecting each of said generator groups in series with one pair of said electrodes, respectively, to effect vectorial summation of the two components as a visible indication of the direction and magnitude of the wave motion.

D. O. SPROULE.